(12) United States Patent
Nors

(10) Patent No.: US 8,406,627 B2
(45) Date of Patent: Mar. 26, 2013

(54) STACKING OF UNITS IN A PASSIVE OPTICAL NETWORK

(75) Inventor: Niclas Sven Nors, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 312 days.

(21) Appl. No.: 12/891,368

(22) Filed: Sep. 27, 2010

(65) Prior Publication Data

US 2012/0076494 A1  Mar. 29, 2012

(51) Int. Cl.
*H04J 14/00* (2006.01)
*H04B 10/20* (2006.01)

(52) U.S. Cl. .......................... 398/67; 398/63

(58) Field of Classification Search .................... 398/63, 398/67

See application file for complete search history.

(56) References Cited

U.S. PATENT DOCUMENTS

| | | | |
|---|---|---|---|
| 2009/0041467 A1* | 2/2009 | Carleton et al. | 398/135 |
| 2010/0329625 A1* | 12/2010 | Reagan et al. | 385/135 |
| 2011/0262132 A1* | 10/2011 | Grindley et al. | 398/43 |

OTHER PUBLICATIONS

"ONT management and control interface specification for B-PON; G.983.2 (Jul. 2005)", ITU-T Standard, International Telecommunication Union, Geneva, CH, No. G.983.2, Jul. 14, 2005 XP017434730.

ITU-T G.984.4 Series G: Transmission Systems and Media, Digital Systems and Networks, Digital sections and digital line system—Optical line systems for local and access networks (Feb. 2008).

* cited by examiner

*Primary Examiner* — Nathan Curs

(57) ABSTRACT

Using the conventional OMCI-model for handling stacking of additional ONUs to a main ONU (Optical Network Unit) connected to an OLT (Optical Line Terminal) in a PON (Passive Optical Network), when the main ONU is not provided with any chassis with physical slots for insertion of the additional units. Instead, the main ONU is initialized to be provided with a virtual chassis that includes a number of temporary virtual cardholders for assigning to an unknown connected stacked ONU, and a number of non-temporary virtual cardholders for assigning to a known stacked connected ONU. From a management perspective, the virtual cardholder corresponds to a physical cardholder/slot according to the conventional OMCI-model.

18 Claims, 6 Drawing Sheets

Method for an OLT (Optical Line Terminal):

STACKING OF UNITS IN A PASSIVE OPTICAL NETWORK

TECHNICAL FIELD

The present invention relates to methods for an ONU (Optical Network Unit) and for an OLT (Optical Line Terminal) of stacking additional ONUs to a main ONU in a PON (Passive Optical Network). The invention also relates to an ONU (Optical Network Unit) and to an OLT (Optical Line Terminal).

BACKGROUND

Broadband access can be implemented by a fiber optical access network, e.g. a B-PON (Broadband Passive Optical Network or a G-PON (Gigabit-capable Passive Optical Network). A passive optical network (PON) does not use any electrically powered components to split the signal, and it comprises an OLT (Optical Line Terminal) located at the service provider's central office and providing an interface for the delivery of the services, e.g. telephony, Ethernet data or video, over the PON. The PON typically comprises one or more ONUs (Optical Network Units) or ONTs (Optical Network Terminations), which are connected to the OLT over an ODN (Optical Distribution Network), the ODN including optical fibers. Each ONT/ONU terminates the PON and converts the optical signals into electrical signals for delivery of the services to the end-user terminals, via a suitable user interface.

A so-called MDU (Multi-Dwelling Unit) is an ONU/ONT for multiple subscribers, e.g. for a number of apartments in an apartment building, and the MDU is provided with a suitable number of ports, such as e.g. 24. On the contrary, a Single Family Unit is an ONT/ONU adapted for a single household.

According to the standards, an ONU (Optical Network Unit) is a generic term for a device that terminates any one of the distributed (leaf) endpoints of an ODN, implements a PON protocol, and adapts PON PDU (Protocol Data Units) to subscriber service interfaces. In some contexts, an ONU implies a multiple-subscriber device, such as the above-mentioned MDU. An ONT (Optical Network Termination) is defined as a single subscriber device that terminates any one of the distributed (leaf) endpoints of an ODN, implements a PON protocol, and adapts PON PDUs to subscriber service interfaces. An ONT may be further provided with an Integrated Residential Gateway.

Thus, an ONT and an MDU are both examples of an ONU. Hereinafter, the generic term ONU denotes an ONU, ONT or an MDU.

The PON management protocol, i.e. the ONT Management and Control Interface (OMCI) protocol, is standardized e.g. according to the OMCI G.984.4-specification, and this management protocol defines different management models. Furthermore, the OMCI-specification contains data models that describe different parts associated with a chassis-based ONU, i.e. a Cardholder, a Circuit Pack and a Port Mapping Package-G.

The Cardholder Managed Entity (ME) defines a cardholder, i.e. a slot, in a chassis where a circuit pack, i.e. a circuit board/card provided with (user) ports, can be inserted, and the Circuit pack Managed Entity defines a circuit pack for insertion into the cardholder. The Port Mapping Package-G defines the ports/user network interfaces (UNI) that exist on a Circuit Pack inserted into a cardholder, but the Port Mapping Package-G is optional, since the Circuit pack ME may also define the ports on a circuit pack. However, in scenarios where a circuit pack contains different ports (UNIs), the Port Mapping Package-G ME is convenient, since it can define multiple port types for a single circuit pack.

Thus, as described above, the Cardholder Managed Entity is defined in the OMCI-specification, and it represents the slot in which a circuit pack can be inserted. This managed entity is created by a chassis-based ONU at startup, based on the pre-defined number of physical slots in the ONU chassis. The Cardholder ME has a number of configuration parameters, such as e.g. expected equipment ID and actual equipment ID, to enable both a configuration of an expected circuit pack in a slot, as well as a notification of an actually inserted circuit pack.

The Circuit Pack ME defines properties for a circuit pack, and it comprises a number of configuration parameters, such as e.g. the actual port numbers, type of ports, serial number, and vendor. This circuit pack managed entity could be created at different instances and circumstances, for example when the OLT provisions an expected equipment ID, or when the Cardholder ME is configured for plug-and-play. The Circuit Pack ME is provided with correct information when a circuit pack is inserted into a cardholder, i.e. a slot in a chassis of an ONU.

The Port Mapping Package-G Managed Entity enables a circuit pack to represent different type of UNIs (User Network Interfaces) on the same circuit pack, which is an extension to the information found in Circuit Pack.

FIG. 1a illustrates a conventional 24 ports Ethernet and Voice capable, integrated and non-modular MDU (Multi-Dwelling Unit) 10, provided with a single optical uplink interface 13a for connecting an optical fiber. If an operator needs more user interfaces, a possible solution would be to stack another MDU to a first MDU and pull another fiber, which is costly. Another solution would be to build a larger MDU, having more end-user ports. However, an operator may prefer to not invest in a larger unit until additional subscribers exist. Instead, several operators are asking for a modular MDU that can be expanded as the number of subscribers increases.

However, a modular MDU/ONU is normally more expensive, since it requires more flexibility, a backplane, a controller card, and removable circuit cards. A non-modular ONU typically has a single optical interface serving all the user interfaces, but cannot be expanded to support an increasing number of end-users.

Since a chassis-based modular ONU comprising removable circuit cards is not always feasible for cost reason, it would be advantageous to implement a modular ONU by stacking additional ONUs to a main ONU without any chassis, enabling an increase of the number of user ports, as the number of subscribers increases. Thereby, a modular ONU can be achieved without requiring any additional optical fibers, or any chassis-based ONU with backplane. The stacked units may be interconnected e.g. using the Ethernet, keeping the same hardware and single software.

Thus, a modular ONU may be implemented by stacking a second MDU 12a to a main MDU 10, with a suitable interconnection 14a between the units, the second unit sharing the PON uplink interface 13a with the main unit, which is illustrated in FIG. 1b.

FIG. 1c illustrates the stacking of two MDUs 12a, 12b to the main MDU 10, with a first interconnection 14a between the main MDU 10 and the second MDU 12a, a second interconnection 14b between the second MDU 12a and the third MDU 12b, and a third interconnection 14c between the main MDU 10 and the third MDU 12b. The main unit and the third MDU are both provided with PON uplink interfaces 13a, 13b, wherein the resulting stacked MDU may have two PON uplinks for redundancy and/or aggregation. By having two MDUs with a PON uplink interface in the same stacked cluster, the traffic load from the user interfaces could be shared between the two available PON uplinks. If one of the uplinks fails, all the traffic could be re-directed through the working uplink. The available bandwidth would be less then when both units are operating, but it would provide a certain protection when the service level degrades.

However, as described above, the Managed Entities of the OMCI model are defined for a chassis-based ONU that has a pre-defined set of cardholders/slots, with removable circuit packs for insertion into the cardholders/slots. The OMCI-model, as defined in the OMCI specification, does not cover the scenario of simply stacking additional ONUs to a main ONU, without any chassis.

SUMMARY

It is an object of the present invention to address at least some of the problems outlined above.

This object and others are achieved by the method and the arrangement according to the appended independent claims, and by the embodiments according to the dependent claims.

According to one aspect, the invention provides a method for a main ONU (Optical Network Unit), which is connected to an OLT (Optical Line Terminal) in a PON (Passive Optical Network), of stacking an additional ONU. The method comprises the main ONU discovering a connected additional stacked ONU, and if the connected additional stacked ONU is unknown, then the main ONU assigns an available temporary virtual cardholder to the stacked ONU, the stacked ONU being non-operational in the assigned temporary virtual cardholder. Thereafter, the main ONU notifies the OLT of the discovered unknown additional stacked ONU, and creates circuit pack managed entities to represent the additional stacked ONU.

According to a second aspect, the invention provides a method for an OLT (Optical Line Terminal) connected to a main ONU (Optical Network Unit) in a PON (Passive Optical Network) of stacking an additional ONU to the main ONU. The method comprises the OLT receiving a notification from the main ONU of a discovered connected unknown additional stacked ONU, provisioning a non-temporary virtual cardholder for assignment to the discovered additional stacked ONU, and sending provisioning information to the main ONU.

According to a third aspect, the invention provides an ONU (Optical Network Unit) connectable to an OLT (Optical Line Terminal) in a PON (Passive Optical Network). The ONU is arranged to handle stacking of an additional ONU, and comprises—a communication device comprising a sender and a receiver for communicating with the OLT, a virtual chassis comprising one or more non-temporary virtual cardholders and one or more temporary virtual cardholders, and a stacking device comprising a processing circuit. The stacking device is configured to:

discover a connected additional stacked ONU;

assign an available temporary virtual cardholder to the additional stacked ONU, if the connected additional stacked ONU is unknown, wherein the additional stacked ONU is non-operational in the assigned temporary virtual cardholder;

notify a connected OLT of the discovered additional stacked ONU, and create circuit pack managed entities to represent the additional stacked ONU.

According to a fourth aspect, the invention provides an OLT (Optical Line Terminal) connectable to a main ONU (Optical Network Unit) in a PON (Passive Optical Network). The OLT is arranged to handle stacking of an additional stacked ONU to the main ONU, and the OLT comprises a communication device comprising a sender and a receiver for communicating over the PON, and a stacking device comprising processing circuit. The stacking device is configured to:

receive a notification from the main ONU of a discovered connected unknown additional stacked ONU;

provision a non-temporary virtual cardholder for assignment to the discovered additional stacked ONU, and send provisioning information to the main ONU.

It is an advantage with the invention that it allows additional ONUs to be connected and stacked to a non-chassis based main ONU, e.g. when the number of subscribers increases, and managed according to a conventional OMCI-model for a chassis-based ONU. Further, the ONUs can be discovered and provisioned by the OLT, independently of the order of the connection of the different units.

BRIEF DESCRIPTION OF THE DRAWINGS

The present invention will now be described in more detail, and with reference to the accompanying drawings, in which:

FIG. 1b is a schematic block diagram illustrating a second MDU stacked to a main MDU, according to FIG. 1a;

DETAILED DESCRIPTION

Figure 1A:
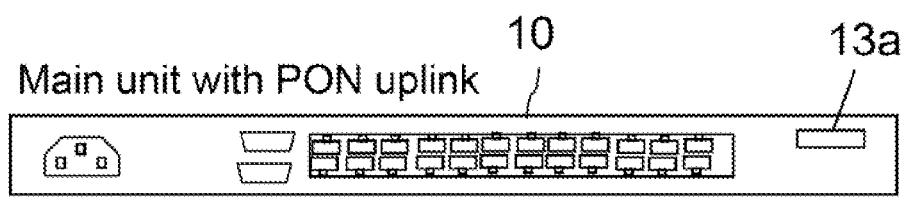
FIG. 1a is a schematic block diagram illustrating a conventional non-modular MDU, without any chassis.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and, a memory coupled to the processor, wherein the memory is encoded with one or more programs that may perform the functions disclosed herein.

Thus, it is an object to enable stacking of additional ONUs to a main ONU without a chassis, using the conventional OMCI-model and the standardized managed entities according to the OMCI-specification. The OMCI-model should also be used to configure and manage the stacked ONUs, the ONUs being interconnected e.g. using the Ethernet.

A concept according to the embodiments described hereinafter is to provide a main ONU with a virtual chassis comprising temporary virtual cardholders for "storage" of additional ONUs that are connected, i.e. stacked, to the main ONU, and non-temporary virtual cardholder for assignment of the stacked connected ONU after provisioning. The temporary virtual cardholders and the non-temporary virtual cardholders of a main ONU are managed similarly as conventional non-virtual cardholders, according to the OMCI-model. However, the temporary virtual cardholders may be numbered differently than the non-temporary virtual cardholder, e.g. by using different card holder id ranges.

However, as indicated above, these temporary and non-temporary virtual cardholders, according to embodiments of the invention, are only virtual cardholders, and not any real physical slots in a chassis for inserting an additional ONU, i.e. no real physical cardholders for insertion of a circuit pack, according to the OMCI-model. Instead, an additional ONU is only connected to the main ONU, and not inserted in a slot in chassis. Accordingly, it can be located on any suitable location, e.g. in the near vicinity of the main ONU, or at a suitable distance.

According to the embodiments of the invention, the temporary virtual cardholders of the main ONU are used as a temporary storage place for stacked additional ONUs that are connected to a main ONU, but still not provisioned by the OLT. When a stacked connected ONU is recognized by the main ONU, i.e. after the main ONU has received provisioning information from the OLT, the stacked ONU is moved to a non-temporary virtual cardholder and can become operational. However, the movement of a stacked ONU between a non-temporary virtual cardholder and a temporary virtual cardholder is also only virtual, i.e. it does not have to be an actual physical movement, and the stacked ONU may still remain in its original location.

According to embodiments of this invention, a virtual chassis is modeled as a real chassis. Thus, from a management perspective, a virtual cardholder of the virtual chassis corresponds to a cardholder of a real chassis, and can be managed in a similar way, in compliance with the OMCI-specification.

Further, according to embodiments of the invention, a temporary virtual cardholder is not configurable to expect a "circuit pack", i.e. a stacked ONU, and is only used temporarily. In a temporary virtual cardholder, a connected stacked ONU will appear as a virtual circuit pack from a management perspective. A cardholder managed entity is used to configure a connected virtual ONU for a non-temporary virtual cardholder, and the parameters are defined according to the OMCI, similarly as for a real chassis-based ONU. After configuring, the connected ONU is "moved" from a temporary virtual cardholder, and "inserted" into a non-temporary virtual cardholder of the virtual chassis, and can become operational.

During the installation, a main ONU is installed in the same manner as any ONU. It is connected to the PON and provisioned by the OLT similarly as a conventional ONU. During the initialization of the main ONU, according to embodiments of this invention, a pre-defined number of non-temporary virtual cardholders are created by the OLT, depending e.g. on the maximum number of stacked ONUs that can be supported by this main ONU, which is normally defined by the manufacturer.

Additionally, a number of temporary cardholders are created for temporary storage of a connected stacked ONU, preferably the same as the number of non-temporary cardholders.

The operator may decide to stack a second ONU to the main ONU when more user interfaces are required, and connect the second ONU to the main ONU via interconnecting ports, for example dedicated Ethernet ports. According to embodiments of the invention, the connected stacked ONU will identify itself over this interconnection by sending its serial number, and optionally additional information such as vendor id, e.g. by using a Link Layer Discovery Protocol. The main ONU will discover the newly connected stacked ONU by its equipment ID and/or serial number, and any additional information sent by the stacked ONU.

According to exemplary embodiments, the stacked ONU will be assigned to the first available empty temporary virtual cardholder, if the connected stacked ONU is unknown to the main ONU, and the OLT is notified that a new ONU has been discovered, e.g. by the main ONU sending an AVC (attribute value changed) to the OLT. The main ONU will create the necessary Circuit Pack Managed Entities, according to the OMCI-standard, to represent the stacked ONU. The circuit pack Managed Entities for the stacked ONU are based on the equipment id and/or serial number, which identifies the type of stacked unit. Further, port mapping package-g Managed Entities may be created according to the physical properties of the ONU.

According to a further embodiment of the invention, the stacked ONU is not operational in the temporary virtual cardholder, and it will not be allowed to pass any traffic at this time. This can be achieved e.g. by blocking all the traffic on the port where the stacked ONU was discovered, or by blocking the traffic from this source address, depending on if the port is used for interconnecting multiple stacked ONUs or not.

When the OLT is notified of a newly connected stacked ONU, the operator is able to provision the connected stacked ONU. The operator, i.e. the OLT, will provision a non-temporary virtual cardholder for "insertion" of the connected stacked ONU, according to exemplary embodiments, and the stacked ONU is identified e.g. via the serial number. When the non-temporary virtual cardholder is provisioned, the stacked ONU will be "moved" from the temporary virtual cardholder to the newly provisioned non-temporary virtual cardholder, and can become operational.

However, if the newly connected stacked ONU is known by the main ONU, i.e. since the main ONU has been pre-provisioned with the equipment id and/or serial number before connection, then the main ONU will recognize the connected ONU, according to further embodiments. The connected ONU will be directly "inserted" into the non-temporary virtual cardholder where it has been provisioned, and e.g. an AVC is sent to the OLT to notify that a new ONU has been inserted. Since the new stacked ONU is pre-provisioned by the OLT, the stacked ONU may be operational immediately.

Additionally, the main ONU may create the necessary Circuit Pack Managed Entities, according to the OMCI-specification, for representing the stacked ONU, i.e. a virtual circuit pack, based on the equipment id, which identifies the type of stacked unit. The port mapping package-g Managed Entities may also be created, based on the physical properties of the stacked ONU.

When a stacked ONU is removed via configuration operations from the OLT, the stacked ONU is assigned to the first available temporary virtual cardholder, according to a further embodiment of the invention. Accordingly, the stacked ONU will be non-operational, such that no traffic can pass from the stacked ONU via the main ONU, similarly as when a stacked ONU is "inserted" into a temporary virtual cardholder, after discovery. Then, the stacked ONU is physically disconnected from the main ONU. However, while the stacked ONU remains connected, it will reside in the temporary virtual cardholder, and may later be re-inserted into a non-temporary virtual cardholder by provisioning commands from the OLT.

Further, the main ONU may be informed whether the stacked ONU is still physically connected or not, in order to know when to remove the stacked ONU from the temporary virtual cardholder, and e.g. to notify the OLT with an alarm, if the stacked ONU is disconnected suddenly. According to one embodiment, such a continuity check of stacked ONUs is implemented by the stacked ONU periodically sending a message to notify the main ONU that it is still connected. The main ONU may use e.g. the TTL to determine when to expect the next message from the stacked ONU. The described continuity check will enable the main ONU to discover a removal/disconnection of a stacked ONU, and could trigger an alarm to the OLT. If a stacked ONU is discovered to be disconnected, it will be removed from the virtual cardholder in order to make the resources available to another circuit pack, and an alarm or a notification, e.g. an AVC, may be sent by the main ONU to the OLT.

As described in the Background section, FIG. 1a illustrates a conventional 24 ports Ethernet and Voice capable, integrated and non-modular MDU (Multi-Dwelling Unit) 10, with a single optical uplink interface 13a for connecting an optical fiber.

Figure 1B:
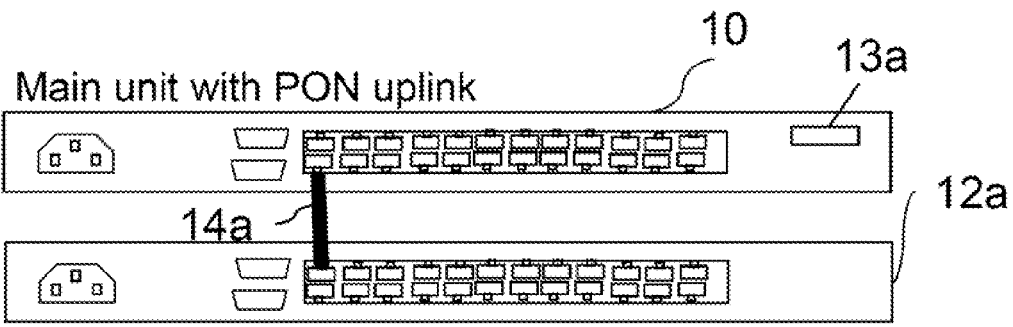

FIG. 1b illustrates the stacking of a second MDU 12a to a main MDU 10 with a suitable interconnection 14a, sharing the PON uplink interface 13a of the main unit.

Figure 1C:
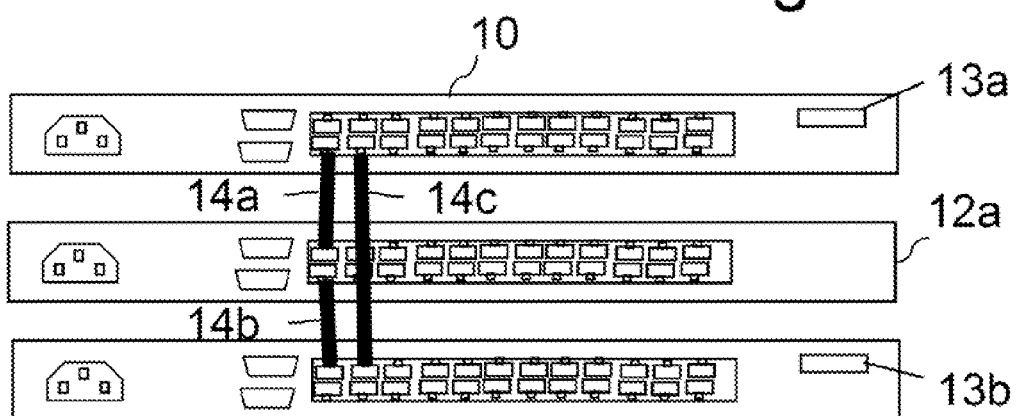
FIG. 1c is a schematic block diagram illustrating two MDUs stacked to a main MDU.

FIG. 1c illustrates the stacking of two MDUs 12a, 12b to the main MDU 10, with a first interconnection 14a between the main MDU 10 and the second MDU 12a, a second interconnection 14b between the second MDU 12a and the third MDU 12b, and a third interconnection 14c between the main MDU 10 and the third MDU 12b. The main unit and the third MDU are both provided with PON uplink interfaces 13a, 13b for redundancy and increased security, in case one of the uplinks fails.

Figure 2:
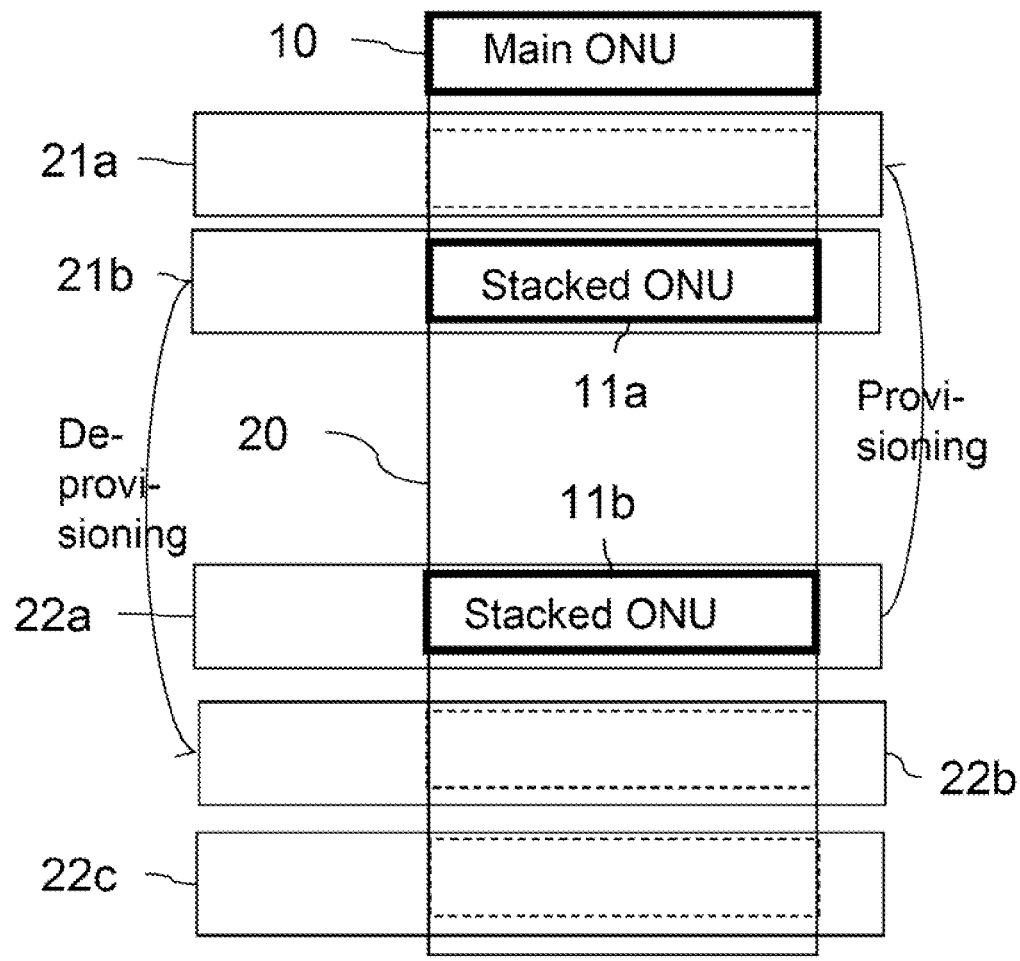
FIG. 2 illustrates logically the stacking of units in a virtual chassis.

FIG. 2 illustrates logically the stacking of ONUs to a main ONU 10 in a virtual chassis 20. This exemplary virtual chassis comprises three temporary virtual cardholders, 22a, 22b and 22c, and two non-temporary virtual cardholders, 21a, 21b. (However, according to a preferred embodiment, the number of virtual cardholders is the same of the number of non-virtual cardholders.)

A newly connected stacked ONU, i.e. an ONU 11b that is unknown to the main ONU, has been assigned to the first available temporary virtual cardholder 22a, where the stacked ONU is non-operational. When this stacked ONU 11b is provisioned by the OLT, it will be virtually "moved" to a non-temporary virtual cardholder, i.e. assigned to the non-temporary virtual cardholder 21a.

When deprovisioning information is received by the main ONU from the OLT regarding the stacked ONU 11a, this stacked ONU will be virtually "moved" to a temporary virtual cardholder, i.e. assigned to an available temporary virtual cardholder 22b, where it will be non-operation.

Figure 3:
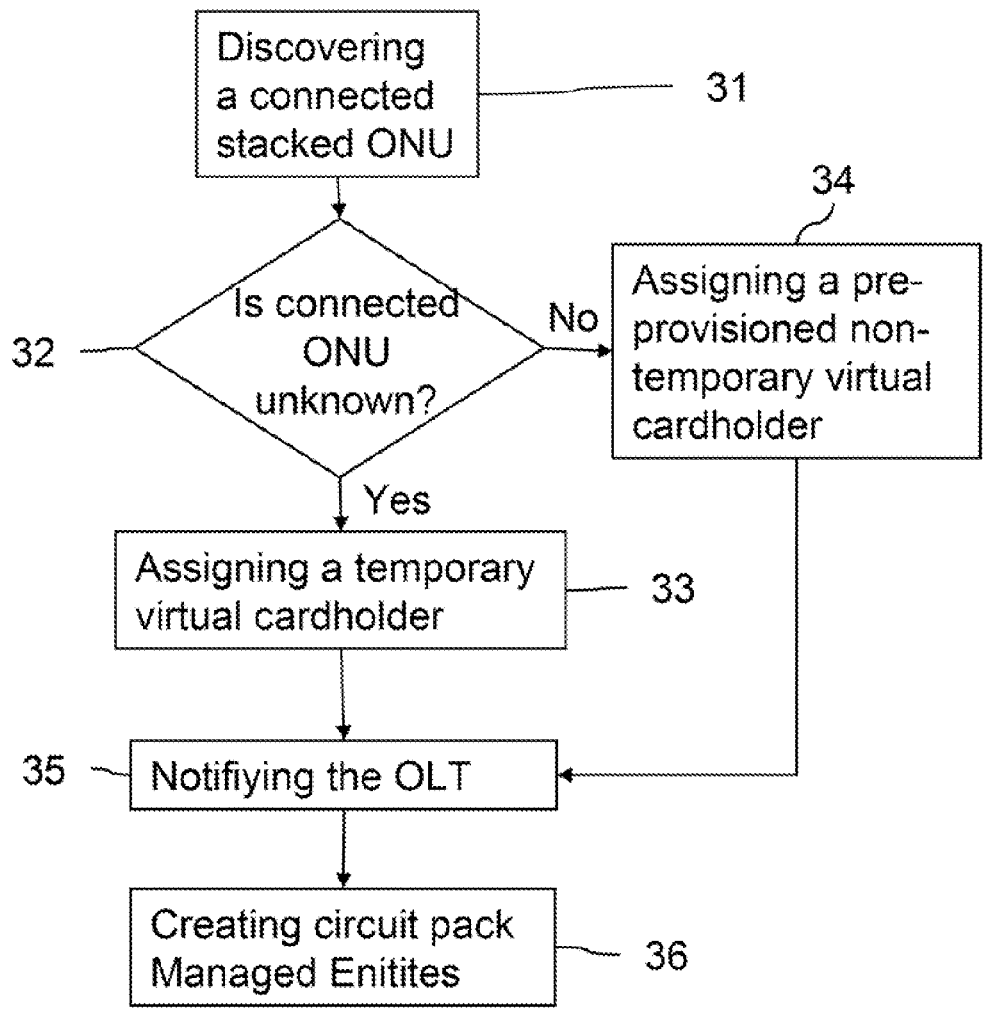
FIG. 3 is a flowchart illustrating exemplary methods of the invention, as performed by an ONU.

FIG. 3 is a flowchart illustrating embodiments of the invention, as performed by a main ONU, when a new ONU has been connected. In step 31, the main ONU discovers the connected additional stacked ONU, and receives e.g. the Equipment ID. If the connected stacked ONU is unknown to the main ONU, as determined in step 32, then the stacked ONU is assigned, in step 33, to an available temporary virtual cardholder, and the OLT is notified, in step 35. However, if it is determined in step 32 that the stacked ONU is known, then it is assigned to a pre-provisioned non-temporary virtual cardholder, and the OLT is notified, in step 35. In the consecutive step 36, the main ONU creates Circuit Pack Managed Entities for representing the stacked ONU, as defined in the OMCI.

According to further embodiments of the method, as performed by the main ONU, the main ONU receives provisioning information for the unknown connected stacked ONU from the OLT and assigns a provisioned non-temporary virtual cardholder to the stacked ONU, which will be operational in the assigned cardholder.

According to a still further embodiment, a removal of an operational stacked ONU comprises the main ONU receiving information from the OLT of the removal of the stacked ONU, and assigning an available temporary virtual cardholder to the stacked ONU, which will be non-operational in the assigned virtual cardholder.

Further, a re-insertion of the non-operational stacked ONU comprises the main ONU receiving provisioning information regarding the ONU from the OLT, and assigning a provisioned non-temporary virtual cardholder to the stacked ONU, which will be operational in the assigned virtual cardholder.

According to another exemplary embodiment, the method further comprises a continuity check of a connected stacked ONU in a temporary virtual card-holder, the continuity check comprising the main ONU receiving a periodical message from the connected stacked ONU, the message indicating the identity of the stacked ONU, and removing the stacked ONU from the temporary virtual card holder, if no periodical message is received, and sending a notification to the OLT.

Figure 4:
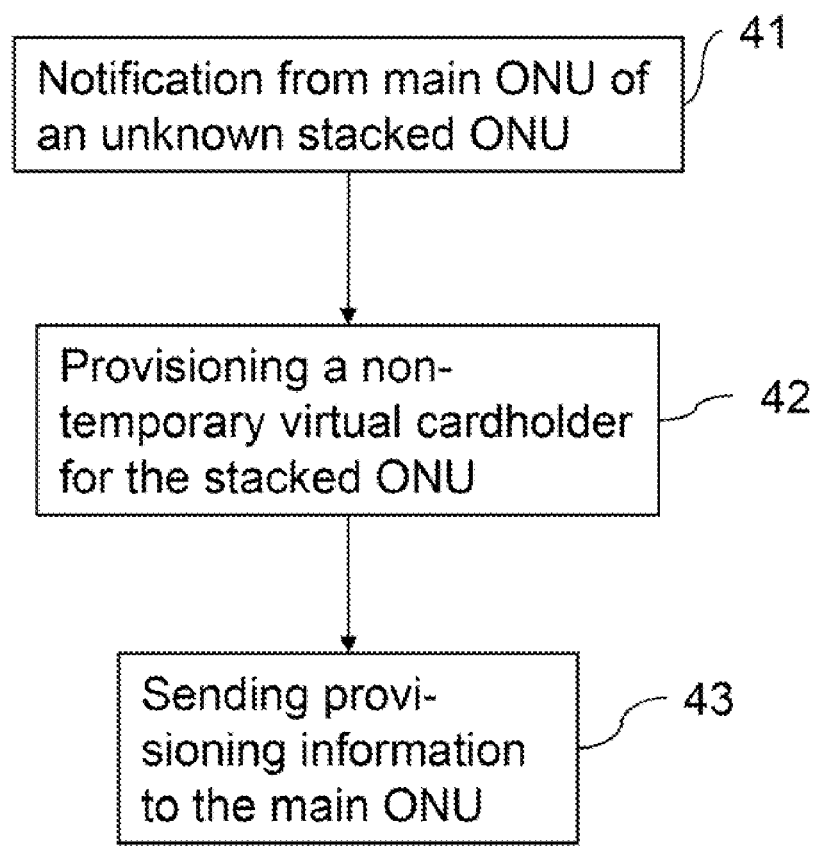
FIG. 4 is a flowchart illustrating exemplary methods of the invention, as performed by an OLT.

FIG. 4 is a flowchart illustrating embodiments of a method performed by an OLT. In step 41, the OLT receives a notification from the main ONU that an unknown connected stacked ONU has been discovered. In step 42, a non-temporary virtual cardholder is provisioned by the OLT to receive the new connected stacked ONU, and the provisioning information is sent to the main ONU, in step 43.

Preferably, the notification is an AVC (Attribute Value Changed).

According to a further exemplary embodiment, the method is preceded by an initialization of the main ONU, the initialization comprising creating one or more non-temporary virtual cardholders and one or more temporary virtual cardholder for a virtual chassis of the main ONU.

According to another embodiment, a removal of an operational stacked ONU comprises sending information regarding the removal to the main ONU.

Figure 5:
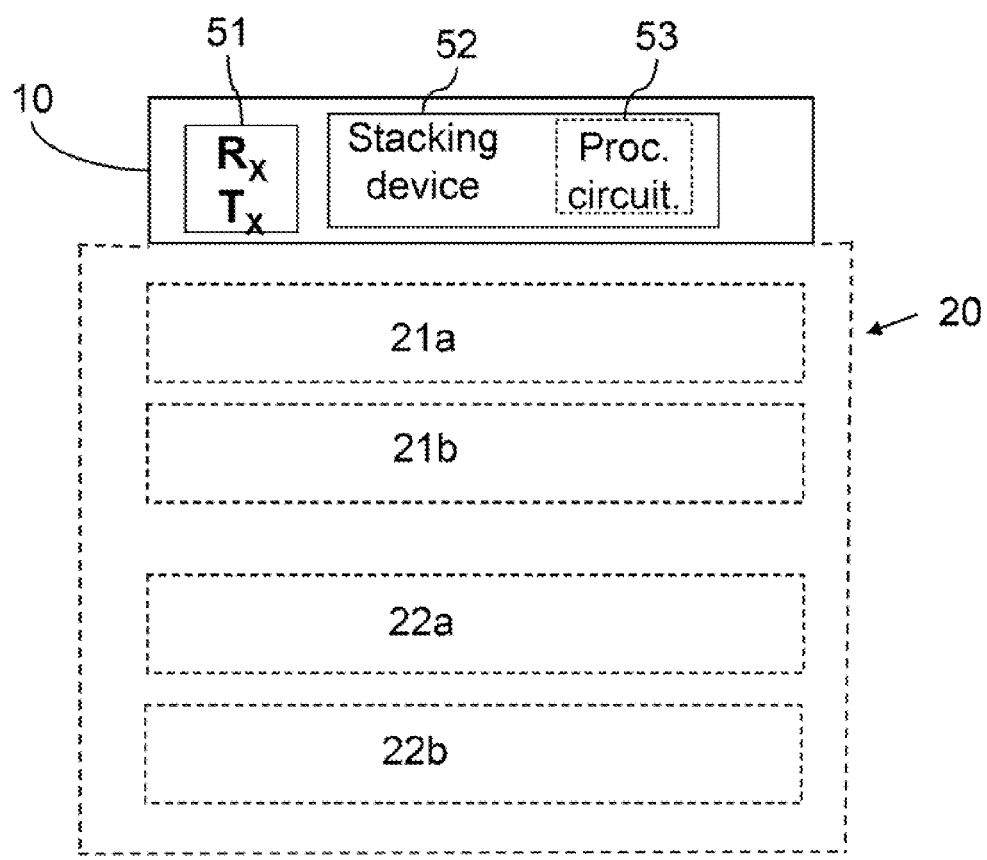
FIG. 5 is a block diagram illustrating an ONU, according to embodiments of this invention.

FIG. 5 is a block diagram schematically illustrating an exemplary main ONU 10, according to embodiments of this invention. During the initialization, the main ONU has been provided with a virtual chassis 20, comprising two temporary virtual cardholder 22a, 22b, and two non-temporary virtual cardholders 21a, 21b. (Typically, the number of virtual cardholders is larger than two.) The main ONU further comprises an optical communication unit 51, including a sender and a receiver for communicating with the OLT over the PON. The main ONU is also provided with a suitable number of ports/UNIs (not illustrated in the figure) to be connected to the subscribers.

Additionally, the main ONU comprises a stacking device 52, provided with suitable processing circuits 53, and the stacking device is configured to manage stacked ONUs, according to the OMCI model, by discovering a newly connected stacked ONU, assigning an available temporary virtual cardholder to the new ONU, if the ONU is unknown, notifying the OLT of the connected new ONU, and creating circuit pack managed entities to represent the stacked ONU.

According to further exemplary embodiments, the stacking device 52 is configured to assign a pre-provisioned non-temporary virtual cardholder to the connected stacked ONU, if the connected stacked ONU is known to the main ONU. It may also be configured to receive provisioning information from the OLT regarding an unknown connected stacked ONU that has been provisioned by the OLT, and to assign a provisioned non-temporary virtual cardholder to the additional stacked ONU, which is operational in the virtual cardholder.

The main ONU may also comprise a removal device, not illustrated in FIG. 5, which is provided with processing circuits. The removal device is configured to receive information from the OLT of a removal of the stacked ONU, and to assign an available temporary virtual cardholder to the ONU, which will be non-operational in the assigned temporary virtual cardholder.

Further, the main ONU may comprise a re-insertion device, not illustrated in FIG. 5, which is provided with processing circuits. The re-insertion device is configured to receive provisioning information from the OLT regarding a non-operational stacked ONU in a temporary virtual cardholder, and to assign a provisioned non-temporary virtual cardholder to the stacked ONU, wherein the stacked ONU will be operational in the assigned virtual cardholder.

The main ONU may also comprise a continuity checking device, not illustrated in FIG. 5, which is provided with processing circuits. The continuity checking device is configured to receive a periodical message from a connected stacked ONU, the message indicating the identity of the stacked ONU, and to remove the stacked ONU from the virtual cardholder and send a notification to the OLT, if the periodical message is not received.

Figure 6:
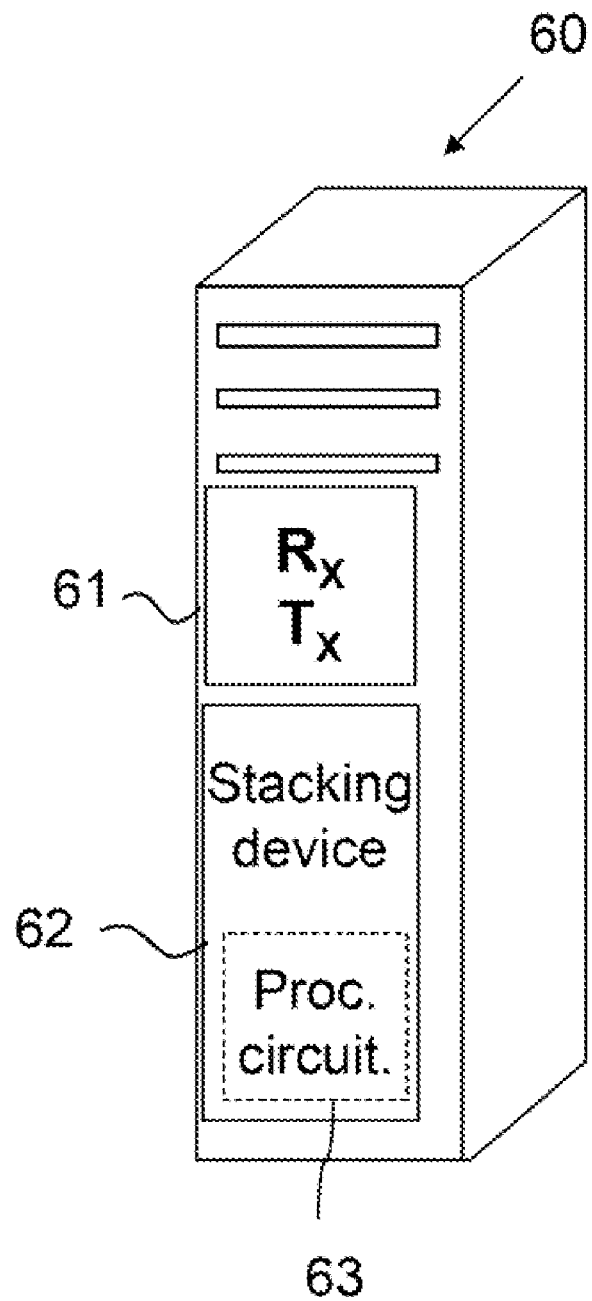
FIG. 6 is a block diagram illustrating an OLT, according to embodiments of this invention.

FIG. 6 is a block diagram schematically illustrating an exemplary OLT (Optical Line Terminal) 60, according to embodiments of this invention. A typical OLT (Optical Line Terminal) provides an interface between the services from the operator, such as e.g. telephony, data and video, and the PON, and the OLT is located at the service provider. The illustrated OLT comprises an optical communication unit 61, including a sender and a receiver for communicating with the ONU over the PON. Further, the OLT is provided with a stacking device, comprising suitable processing circuits 63 for managing the stacking of ONUs in agreement with the OMCI-model. Thus, the stacking device is configured to receive notifications from the main ONU, to provision a non-temporary virtual cardholder for assigning to a connected unknown stacked ONU, and to send provisioning information to the main ONU.

The OLT may comprise an initialization device, not illustrated in FIG. 6, which is provided with processing circuits, the initialization device being configured to create one or more non-temporary virtual cardholders and one or more temporary virtual cardholders for a virtual chassis of a connected main ONU.

The entities and units described above with reference to FIGS. 5 and 6 are logical units, and do not necessarily correspond to separate physical units. Thus, the person skilled in the art would appreciate that the units disclosed in the FIGS. 5 and 6 may be implemented as physically integrated units, and/or physically separate units, and that the units are provided with appropriate processing circuits.

It is an advantage with the invention that it accomplishes a cost-efficient and expandable non-chassis based ONU, and enables configuration and management of additional stacked ONUs, in the same way as for circuit packs inserted in a chassis-based ONU, using a conventional OMCI-model.

Furthermore, the above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

OLT Optical Line Terminal
ONT Optical Network Termination
ONU Optical Network Unit
OMCI Optical network termination Management and Control Interface
ODN Optical Distribution Network
UNI User Network Interface
ME Managed Entity
MDU Multi-Dwelling Unit

The invention claimed is:

1. A method performed by a main ONU (Optical Network Unit), which is connected to an OLT (Optical Line Terminal) in a PON (Passive Optical Network), of stacking an additional ONU, the method comprising:
    discovering a connected additional stacked ONU;
    if the connected additional stacked ONU is unknown, then
        assigning an available temporary virtual cardholder to the stacked ONU, the stacked ONU being non-operational in the assigned temporary virtual cardholder;
        notifying the OLT of the discovered additional stacked ONU;
        creating circuit pack managed entities to represent the additional stacked ONU.

2. The method according to claim 1, wherein if the additional stacked ONU is known, then assigning a pre-provisioned non-temporary virtual cardholder to the stacked ONU, the stacked ONU being operational in the assigned non-temporary virtual cardholder.

3. The method according to claim 1, wherein if the connected additional stacked ONU is unknown, the method further comprising:
    receiving provisioning information for the unknown connected ONU from the OLT;
    assigning a provisioned non-temporary virtual cardholder to the stacked ONU, wherein the stacked ONU is operational in the assigned cardholder.

4. The method according to claim 1, further comprising:
    wherein a removal of an operational stacked ONU comprises:
        receiving information from the OLT of the removal of the stacked ONU;
        assigning an available temporary virtual cardholder to the ONU, wherein the ONU is non-operational in the assigned cardholder.

5. The method according to claim 4, further comprising:
    wherein a re-insertion of the non-operational stacked ONU comprises:
        receiving provisioning information regarding the stacked ONU from the OLT;

assigning a provisioned non-temporary virtual cardholder to the stacked ONU, the stacked ONU being operational in the assigned virtual cardholder.

6. The method according to claim 1, further comprising:
performing a continuity check of a connected stacked ONU in a temporary virtual card-holder, the continuity check comprising:
receiving a periodic message from the connected stacked ONU, the message indicating the identity of the stacked ONU;
removing the stacked ONU from the temporary virtual card holder if no periodical message is received, and sending a notification to the OLT.

7. A method performed by an OLT (Optical Line Terminal) connected to a main ONU (Optical Network Unit) in a PON (Passive Optical Network) of stacking an additional ONU to the main ONU, the method comprising:
receiving a notification from the main ONU of a discovered connected unknown additional stacked ONU;
provisioning a non-temporary virtual cardholder for assignment to the discovered additional stacked ONU;
sending provisioning information to the main ONU.

8. The method for an OLT (Optical Line Terminal), according to claim 7, wherein the received notification is an AVC (Attribute Value Changed).

9. The method for an OLT (Optical Line Terminal), according to claim 7, preceded by an initialization of the main ONU, the initialization comprising:
creating one or more non-temporary virtual cardholders for a virtual chassis of the main ONU;
creating one or more temporary virtual cardholders for a virtual chassis of the main ONU.

10. The method for an OLT (Optical Line Terminal), according to claim 7, further comprising:
wherein a removal of an operational stacked ONU comprises sending information regarding the removal to the main ONU.

11. An ONU (Optical Network Unit) connectable to an OLT (Optical Line Terminal) in a PON (Passive Optical Network), the ONU arranged to handle stacking of an additional ONU, the ONU comprising:
a communication device comprising a sender and a receiver for communicating with the OLT;
a virtual chassis comprising one or more non-temporary virtual cardholders and one or more temporary virtual cardholders;
a stacking device comprising a processing circuit, the stacking device configured to:
discover a connected additional stacked ONU;
assign an available temporary virtual cardholder to the additional stacked ONU, if the connected additional stacked ONU is unknown, wherein the additional stacked ONU is non-operational in the assigned temporary virtual cardholder;
notify a connected OLT of the discovered additional stacked ONU;
create circuit pack managed entities to represent the additional stacked ONU.

12. The ONU (Optical Network Unit) according to claim 11, wherein the stacking device is further configured to assign a pre-provisioned non-temporary virtual cardholder to the additional stacked ONU, if the additional stacked ONU is known, the stacked ONU being operational in the assigned cardholder.

13. The ONU (Optical Network Unit) according to claim 12, wherein the stacking device is further configured to:
receive provisioning information for an unknown connected additional stacked ONU from the OLT, and
assign a provisioned non-temporary virtual cardholder to the additional stacked ONU, the ONU being operational in the assigned non-temporary virtual cardholder.

14. The ONU according to claim 11, further comprising:
a removal device provided with processing circuits, the removal device configured to:
receive information from the OLT of a removal of the stacked ONU;
assign an available temporary virtual cardholder to the stacked ONU, wherein the ONU is non-operational in the assigned temporary cardholder.

15. The ONU according to claim 14, further comprising:
a re-insertion device provided with processing circuits, the re-insertion device configured to:
receive provisioning information from the OLT regarding a non-operational stacked ONU in a temporary virtual cardholder;
assign a provisioned non-temporary virtual cardholder to the stacked ONU, wherein the ONU is operational in the assigned cardholder.

16. The ONU according to claim 11, further comprising:
a continuity checking device provided with processing circuits, the continuity checking device configured to:
receive a periodic message from a stacked ONU in a temporary virtual cardholder, the message indicating the identity of the stacked ONU;
remove the stacked ONU from the temporary virtual cardholder and send a notification to the OLT, if the periodical message is not received.

17. An OLT (Optical Line Terminal) connectable to a main ONU (Optical Network Unit) in a PON (Passive Optical Network), the OLT arranged to handle stacking of a additional stacked ONU to the main ONU, the OLT comprising:
a communication device comprising a sender and a receiver for communicating over the PON;
a stacking device comprising processing circuit, the stacking device configured to:
receive a notification from the main ONU of a discovered connected unknown additional stacked ONU;
provision a non-temporary virtual cardholder for assignment to the discovered additional stacked ONU;
send provisioning information to the main ONU.

18. The OLT according to claim 17, further comprising an initialization device provided with processing circuits, the initialization device configured to:
create one or more non-temporary virtual cardholders for a virtual chassis of a connected main ONU;
create one or more temporary virtual cardholders for a virtual chassis of the connected main ONU.

* * * * *

UNITED STATES PATENT AND TRADEMARK OFFICE
CERTIFICATE OF CORRECTION

PATENT NO. : 8,406,627 B2  
APPLICATION NO. : 12/891368  
DATED : March 26, 2013  
INVENTOR(S) : Nors Page 1 of 1

It is certified that error appears in the above-identified patent and that said Letters Patent is hereby corrected as shown below:

In the Specification:

In Column 4, Line 65, delete "and, a memory" and insert -- and a memory --, therefor.

Signed and Sealed this  
Ninth Day of July, 2013

Teresa Stanek Rea  
*Acting Director of the United States Patent and Trademark Office*